(12) United States Patent
Hakobyan et al.

(10) Patent No.: US 11,733,352 B2
(45) Date of Patent: Aug. 22, 2023

(54) MIMO RADAR SYSTEM

(71) Applicant: Robert Bosch GmbH, Stuttgart (DE)

(72) Inventors: Gor Hakobyan, Stuttgart (DE); Markus Gonser, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 328 days.

(21) Appl. No.: 17/174,992

(22) Filed: Feb. 12, 2021

(65) Prior Publication Data

US 2021/0270937 A1    Sep. 2, 2021

(30) Foreign Application Priority Data

Feb. 27, 2020   (DE) .......................... 102020202500.2

(51) Int. Cl.
   *G01S 7/42* (2006.01)
   *H04B 7/0413* (2017.01)
   (Continued)

(52) U.S. Cl.
   CPC .............. *G01S 7/42* (2013.01); *G01S 7/2813* (2013.01); *G01S 7/414* (2013.01); *H04B 7/0413* (2013.01)

(58) Field of Classification Search
   CPC .......... G01S 7/42; G01S 7/2813; G01S 7/414; H04B 7/0413
   See application file for complete search history.

(56) References Cited

U.S. PATENT DOCUMENTS 9,810,774 B2 * 11/2017  Wittenberg .......... G01S 13/4463
11,099,267 B2 *  8/2021  Wu ........................ G01S 13/582
(Continued)

FOREIGN PATENT DOCUMENTS

| CN | 109343053 A | * | 2/2019 |
| DE | 102014212284 A1 | | 12/2015 |
| WO | 2018076005 A1 | | 4/2018 |

OTHER PUBLICATIONS

17174992_2023-02-27_CN_109343053_A_M.pdf, machine translation of CN_109343053_A (Year: 2019).*

*Primary Examiner* — Timothy A Brainard
*Assistant Examiner* — Kenneth W Good
(74) *Attorney, Agent, or Firm* — Norton Rose Fulbright US LLP; Gerard Messina

(57) ABSTRACT

A MIMO radar system. The system includes transmitter and receiver arrays, and a control and evaluation unit, designed to: transmit transmission signals according to a time and frequency multiplex scheme in each of multiple repeatedly implemented measuring cycles, the time space and frequency space being divided into non-overlapping time slots and frequency sub-bands and only one single transmitting antenna being active in each time slot and transmitting in only one single frequency sub-band, carry out preliminary distance estimations and Doppler estimations, each based on signals of an individual transmitting antenna, in a first evaluation stage based on signals received in one measuring cycle, and carry out joint distance, Doppler, and angle estimations using a multi-dimensional estimation algorithm in a second evaluation stage based on phases of the signals transmitted by various transmitting antennas, results of the first evaluation stage being refined by increasing the accuracy and/or by eliminating ambiguities.

15 Claims, 5 Drawing Sheets

(51) Int. Cl.
*G01S 7/28* (2006.01)
*G01S 7/41* (2006.01)

(56) References Cited

U.S. PATENT DOCUMENTS

| | | | | |
|---|---|---|---|---|
| 11,513,187 | B2* | 11/2022 | Stettiner | G01S 13/931 |
| 2007/0152871 | A1* | 7/2007 | Puglia | G01S 13/34 |
| | | | | 342/134 |
| 2007/0222667 | A1* | 9/2007 | Burlet | G01S 7/292 |
| | | | | 342/146 |
| 2015/0198705 | A1* | 7/2015 | Schoor | H01Q 25/00 |
| | | | | 342/147 |
| 2016/0131742 | A1* | 5/2016 | Schoor | H01Q 3/247 |
| | | | | 342/128 |
| 2016/0131752 | A1* | 5/2016 | Jansen | G01S 13/42 |
| | | | | 342/27 |
| 2017/0160380 | A1* | 6/2017 | Searcy | G01S 7/2921 |
| 2017/0315221 | A1* | 11/2017 | Cohen | G01S 13/42 |
| 2018/0356498 | A1* | 12/2018 | Stachnik | G01S 7/2921 |
| 2019/0346533 | A1* | 11/2019 | Robinson | G01S 3/50 |
| 2020/0025906 | A1* | 1/2020 | Kesaraju | G01S 13/931 |
| 2020/0033442 | A1* | 1/2020 | Gulati | H04K 1/00 |
| 2020/0233076 | A1* | 7/2020 | Chen | G01S 7/4865 |
| 2021/0173042 | A1* | 6/2021 | Wu | H04J 3/02 |
| 2021/0173069 | A1* | 6/2021 | Wu | G01S 13/345 |

* cited by examiner

MIMO RADAR SYSTEM

CROSS REFERENCE

The present application claims the benefit under 35 U.S.C. § 119 of German Patent Application No. DE 102020202500.2 filed on Feb. 27, 2020, which is expressly incorporated herein by reference in its entirety.

FIELD

The present invention relates to a MIMO radar system, in particular, for motor vehicles.

BACKGROUND INFORMATION

Radar systems are used to an increasing extent in motor vehicles for detecting the vehicle surroundings and provide pieces of information about distances, relative velocities and direction angles of located objects, such as vehicles or obstacles, to one or to multiple safety functions or convenience functions, which relieve the driver during the driving of the motor vehicle or completely or partially replace the human driver. In these systems, MIMO (multiple input-multiple output) systems are increasingly used, in which multiple transceiver antennas are employed.

PCT Application NO. WO 2018/076005 A1 mentions various types of MIMO radar systems: transmitters and/or receivers may be situated at different positions and a time multiplexing method, TDMA (Time Division Multiple Access), or a frequency multiplexing method, FDMA, (Frequency Division Multiple Access), may be used.

A MIMO radar measuring method is described in German Patent Application No. DE 10 2014 212 284 A1, in which a transmitted signal is ramp-shaped frequency modulated using a modulation pattern, in which sequences of ramps are assigned to different transmission switching states, which differ in the selection of antenna elements used for transmitting, and are temporally interleaved with one another. In turn, multiple sequences, which are temporally interleaved with one another, are assigned to one transmission switching state. Based on a peak position in a two-dimensional spectrum of a signal obtained for a sequence, values for a relative velocity of a radar target are determined, which are periodic with a predetermined velocity period. Phase relationships of spectral values in the spectra for the sequences of a transmission switching state are compared with phase relationships expected for respective periodic values of the relative velocity, and an estimated value for the relative velocity is selected based on the comparison result.

A MIMO radar system has already been provided by the applicant, in which the repetition rate of the multiplex sequences is below the Nyquist limit for unambiguous Doppler measurement, so that the results of the relative velocity measurements, though in fact high resolution, are ambiguous. To resolve this ambiguity, the provided method capitalizes on the fact that the demultiplex methods, with which signals that are able to be unambiguously assigned to the individual transmitting antennas of the transmitter array are reconstructed again from the received signals, provide results of high quality only if the phase offset caused by the Doppler effect is appropriately corrected. For this purpose, however, the relative velocity of the relevant object must be known. The ambiguity is resolved by testing the various ambiguity hypotheses and then selecting that hypothesis, which yields the signal with the highest quality measure during demultiplexing.

SUMMARY

An object of the present invention is to provide a MIMO radar system, in which distances, relative velocities and location angles of radar objects are able via efficient signal processing to be determined with greater accuracy and with a large uniqueness range.

This object may be achieved according to example embodiments of the present invention. In accordance with an example embodiment of the present invention, a MIMO radar system is provided which includes:
  a transmitter array, which includes multiple transmitting antennas situated at a distance from one another in one angle resolution direction,
  a receiver array, which includes multiple receiving antennas situated at a distance from one another in the angle resolution direction,
  and a control and evaluation unit, which is designed:
    to transmit transmission signals via the transmitter array according to a time multiplex and frequency multiplex scheme in each of multiple repeatedly implemented measuring cycles, the time space and frequency space being divided into non-overlapping time slots and into frequency sub-bands and only one single transmitting antenna being active in each time slot and transmitting in only one single frequency sub-band,
    to carry out preliminary distance estimations and Doppler estimations in a first evaluation stage based on the signals received in one measuring cycle and
    to carry out a joint distance estimation, Doppler estimation and angle estimation with the aid of a multi-dimensional estimation algorithm in a second evaluation stage based on the phases of the signals transmitted by various transmitting antennas, the results of the first evaluation stage being refined by increasing the accuracy and/or by eliminating ambiguities.

In the radar system according to an example embodiment of the present invention, a so-called undersampling may take place in the first evaluation stage, at least in the measuring dimensions distance and relative velocity (Doppler shift) and, optionally, also in the angle dimension (in the azimuth and/or elevation), in which all the information available is evaluated in a compressed form, with which a certain loss of information is initially taken into account. In the case of the distance estimation or Doppler estimation, the undersampling may, for example, be that for each individual transmitting antenna, the measuring time is so short that only a limited resolution is achieved. In the case of the Doppler estimation, the undersampling may also be that for each individual transmitting antenna, the sampling frequency is so low that although a longer measuring time and thus a higher resolution is achieved, a certain ambiguity of the measured results in return must be taken into account. In the case of the angle estimation, the undersampling may be that the transmitter array and/or the receiver array has/have a small aperture and that the angle resolution is thus limited, or that in the transmitter array and/or receiver array the antenna distances are greater (and thus the spatial frequency is lower) than the Nyquist limit so that ambiguities occur. In this case, however, the transmitter array and the receiver array are configured on the whole in such a way that the virtual array formed by different combinations of the transceiver antennas has a large aperture and antenna distances below the Nyquist limit.

Only in the second evaluation stage are the signals obtained by the various transmitting antennas then combined with one another in order to exhaust the full information content. This capitalizes on the fact that the signals transmitted by the various transmitting antennas exhibit a time offset and frequency offset and, thus, Doppler-dependent and distance-dependent phases, and these phases also contain a piece of angle information as a function of the aperture of the transmitter array. Since the distance dependencies, velocity dependencies and angle dependencies of the phases are coupled to one another, a joint parameter estimation takes place in this step in all three dimensions with the aid of a multidimensional estimation algorithm. Each point in the three-dimensional parameter space represents a hypothetical object, whose distance, relative velocity, and location angle are given by the coordinates of the point. For each of these points, it must then be checked whether the phases of the signals received in the various transceiver channels correspond to those values that would be expected for the given combination of distance, relative velocity and angle in the case of a real object.

In spite of the multidimensionality of the parameter space, this parameter estimation may be carried out in an efficient and resource-preserving manner even for a large number of transceiver antennas, since the search area in which the located objects in this parameter space must be situated, is already substantially limited by the results obtained in the first evaluation stage. Only those points in the parameter space that are compatible with the results of the first evaluation stage need to be examined. Compatibility in this case means that if a parameter (distance, relative velocity or angle) has been measured in the first evaluation stage only with limited resolution, the difference between the values obtained in the first and in the second stage may not be greater than the resolution limit in the first stage. Thus, the search may be limited to the immediate surroundings of the point found in the first stage. If, on the other hand, a parameter in the first stage has been measured with a higher resolution, but the results are ambiguous, compatibility then means that one of the ambiguous values (ambiguity hypotheses) may differ from the value obtained in the second stage at most by the resolution limit in the second stage. Thus, the search may be restricted to surroundings of the relevant ambiguity hypotheses.

The measuring and evaluation method, which is implemented in the above-described system, also forms part of the disclosure content of this application.

Advantageous embodiments and refinements of the present invention are described herein.

In one advantageous specific embodiment of the present invention, an angle estimation also already takes place in the first evaluation stage based on the phases of the signals, which are received by the multiple receiving antennas but which have been transmitted by the same transmitting antenna. These angle data have a low-resolution or they are ambiguous, depending on the aperture and antenna distance of the receiver array. In the second evaluation stage, the resolution is improved or the ambiguity is resolved by comparing the phases of the signals obtained by various transmitting antennas.

In one specific embodiment of the present invention, the receiver array has a large, not completely filled aperture, so that the angle estimation on the basis of the receiver array is high-resolution but ambiguous, whereas the transmitter array has a completely filled but smaller aperture, and thus enables unambiguous angle measurements having lower resolution. In another specific embodiment, however, the transmitter array may also have the large aperture and the receiver array the smaller aperture.

In one specific embodiment of the present invention, the radar system is a FMCW or Chirp Sequence Radar, in which the frequency of the transmitted signals is modulated according to a sequence of steep frequency ramps, so-called chirps, the slope of which is so great that the Doppler effect on the ramp is negligible, and thus a pure propagation time measurement, i.e., a distance measurement, is carried out. The relative velocity is then measured by evaluating the phase offset from ramp to ramp caused by the Doppler effect.

According to the principle of Frequency Multiplex, the signals transmitted by the various transmitting antennas have center frequencies that differ from one another. The frequency sub-bands passed over by the frequency ramps may, however, overlap each other. In one specific embodiment, the frequency ramps transmitted by the various transmitting antennas have the same duration and the same slope, so that they differ only with respect to the frequency sub-band.

In one specific embodiment of the present invention, the time multiplex is organized in such a way that an equally long row of equidistant time slots is assigned to each transmitting antenna. This sequence of equidistant time slots then represents a so-called Slow-Time Dimension, in which a velocity estimation takes place, whereas the distance estimation takes place within each time slot (in Fast-Time).

The distribution of the transmitting antennas to the time slots and the frequency sub-bands is preferably uniform in the sense that in one measuring cycle all transmitting antennas are equally often active and all frequency sub-bands are also equally often used. The pattern of distribution may, however, also be regular or also irregular.

In one specific embodiment of the present invention, the time slots that are assigned to the various antennas are interleaved with one another in such a way that one frequency ramp of the first transmitting antenna is followed by a number of frequency ramps that are transmitted by other transmitting antennas before the next frequency ramp of the sequence is transmitted by the first transmitting antenna.

Due to the time offset between the sequences and between the frequency ramps within each sequence, so-called migration effects, i.e., signal distortions may, in principle, result, which are caused by the distance and the velocity of the located object changing during the observed time span.

Preferably, however, the temporal distances of the ramps and of the sequences are selected in such a way that these migration effects are negligible. A time multiplex including short temporal intervals is facilitated not least by the fact that, due to the frequency multiplex, the individual ramps have only a short duration, since for a given ramp slope the complete frequency sub-band is passed through already within a short period of time. The distance estimation and velocity estimation may then take place in a shared step via a two-dimensional Fourier transform.

In another specific embodiment of the present invention, the time slots assigned to the various transmitting antennas are arranged in blocks in such a way that in a first block, the first transmitting antenna transmits a complete sequence of ramps and then in the next block another transmitting antenna transmits a complete sequence. In this case, it is advantageous to compensate for the migration effects, which occur due to the time offset between the blocks and between the ramps within an individual block, with the aid of corresponding signal corrections.

BRIEF DESCRIPTION OF THE DRAWINGS

Exemplary embodiments are explained in greater detail below with reference to the figures.

DETAILED DESCRIPTION OF EXAMPLE EMBODIMENTS

Figure 1:
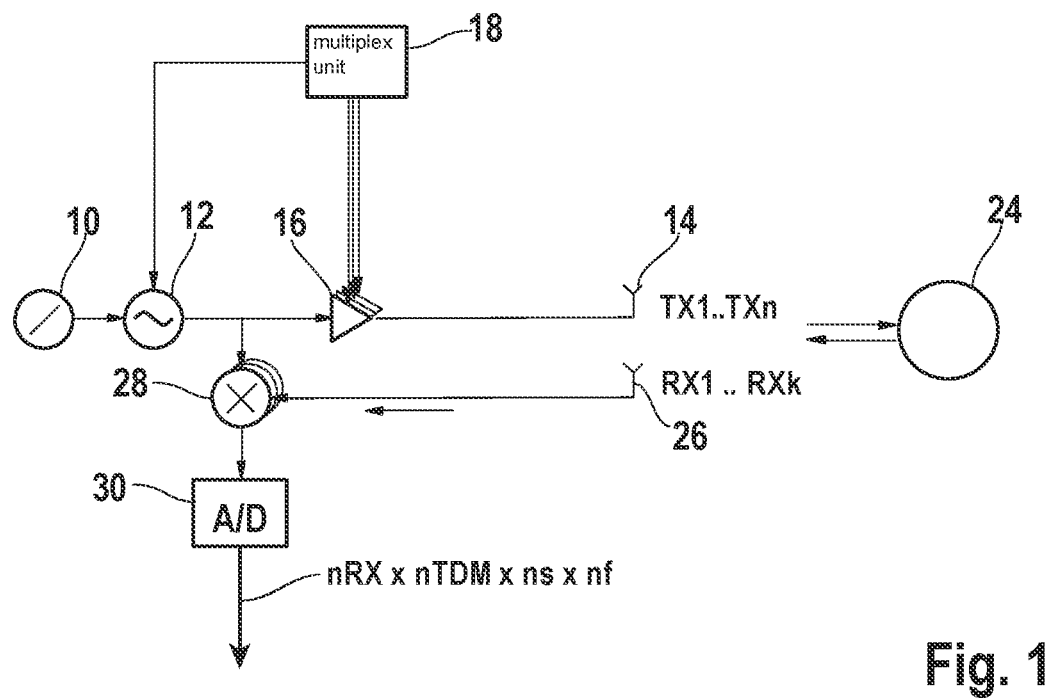
FIG. 1 schematically shows a representation of the analog portion of a MIMO radar system including a separate distance and velocity determination, in accordance with an example embodiment of the present invention.

One exemplary embodiment of a Fast Chirp MIMO radar system is explained with reference to FIGS. 1 through 5 as an example of a FMCW-MIMO radar system in accordance with the present invention. FIG. 1 shows in a schematic and simplified manner the structure of the analog portion of the radar system.

A frequency modulation unit 10 controls a HF oscillator 12, which generates sequences of signals in the form of frequency ramps for multiple transmitting antennas 14. An amplifier 16, which either blocks or forwards the amplified signals to the associated antenna, is situated in each of the multiple transmission channels. Oscillator 12 and amplifier 16 are activated by a multiplex unit 18 according to time and frequency multiplex scheme 20 (FIG. 2) in such a way that each of transmitting antennas 14 transmits a frequency-modulated signal in a particular frequency sub-band within a particular time slot.

The signal transmitted and reflected at an object 24 is received by multiple receiving antennas 26 and mixed in each receiver channel by a mixer 28 with a proportion of the HF oscillator 12 and brought into a low-frequency range. An A/D conversion by an A/D converter 30 then takes place in the conventional manner.

Figure 2:
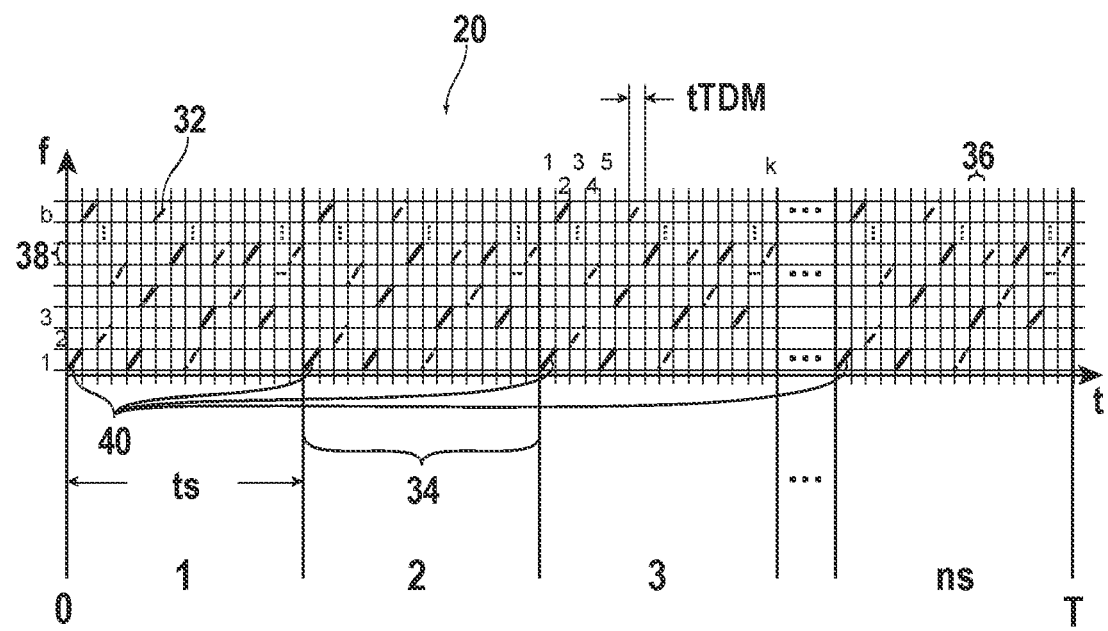
FIG. 2 shows diagrams of the frequency of FMCW transmit signals in a frequency and time multiplex scheme, in accordance with an example embodiment of the present invention.
Figure 2:
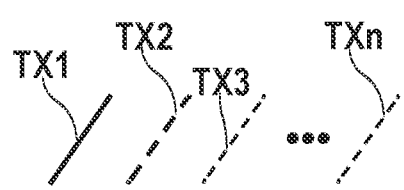

Multiplex scheme 20 is depicted in diagram form in FIG. 2. The diagram shows a complete measuring cycle of duration T.

A "fast chirp" frequency modulation scheme including a sequence of relatively "fast" frequency ramps 32 is used in such a way that distance and velocity may be evaluated essentially separately from one another, for example, with the aid of a two-dimensional Fourier transform. In this way, the Doppler shift within a ramp may, in particular, be ignored or may be corrected based on the Doppler estimation in the second dimension.

Duration T of the measuring cycle is subdivided into a number ns of equally long windows 34 of length ts, which are numbered continuously from left to right at the bottom edge of the diagram. Each window in turn is divided into a number k=nTDM of equally long and non-overlapping time slots 36, which are numbered continuously at the upper edge in window No. 3.

Frequencies f representable by oscillator 12 form a frequency band, which is divided into a number b of frequency sub-bands 38. The sub-bands may, in principle, overlap one another; in the example shown, however, they completely adjoin one another without overlapping. The sub-bands are numbered continuously from bottom to top at the left edge of the diagram.

In each time slot 36, a frequency ramp 32, which fills out exactly one of frequency sub-bands 38, is transmitted by exactly one of transmitting antennas 14. The transmitting antennas are numbered with TX1, TX2, . . . TXn and the association of the frequency ramps with the transmitting antennas is indicated by different line thicknesses and dash-dotted lines.

In the example shown, all frequency ramps 32 have the same slope and the same duration tTDM. The distribution of the frequency ramps to time slots 36 and frequency sub-bands 38 is selected in such a way that all time slots and sub-bands are essentially uniformly occupied. In the entire window 34, each transmitting antenna is active at least once and each sub-band is also used at least once. It is also possible, however, that one transmitting antenna within the window is activated multiple times, whether in various sub-bands or also in the same sub-band. Thus, for example, transmitting antenna TX1 is active twice in sub-band 1 (in time slots 1 and 5) and one time each in sub-bands 3 and 6 (in time slots 8 and 10).

In the example shown, the distribution of the frequency ramps to time slots 36 and frequency sub-bands 38 is repeated in each of windows 34. Each frequency ramp in window No. 1 thus marks the beginning of a sequence 40 of equidistant ramps with ramp distance ts. All ramps of the sequence are situated in the same frequency sub-band.

In another specific embodiment of the present invention, the division may also vary from window to window. Even then, sequences having the same ramp distance are formed, but the ramps do not necessarily have to be situated in the same sub-band. For example, the center frequencies of the ramps may vary linearly over the sequence.

Figure 3:
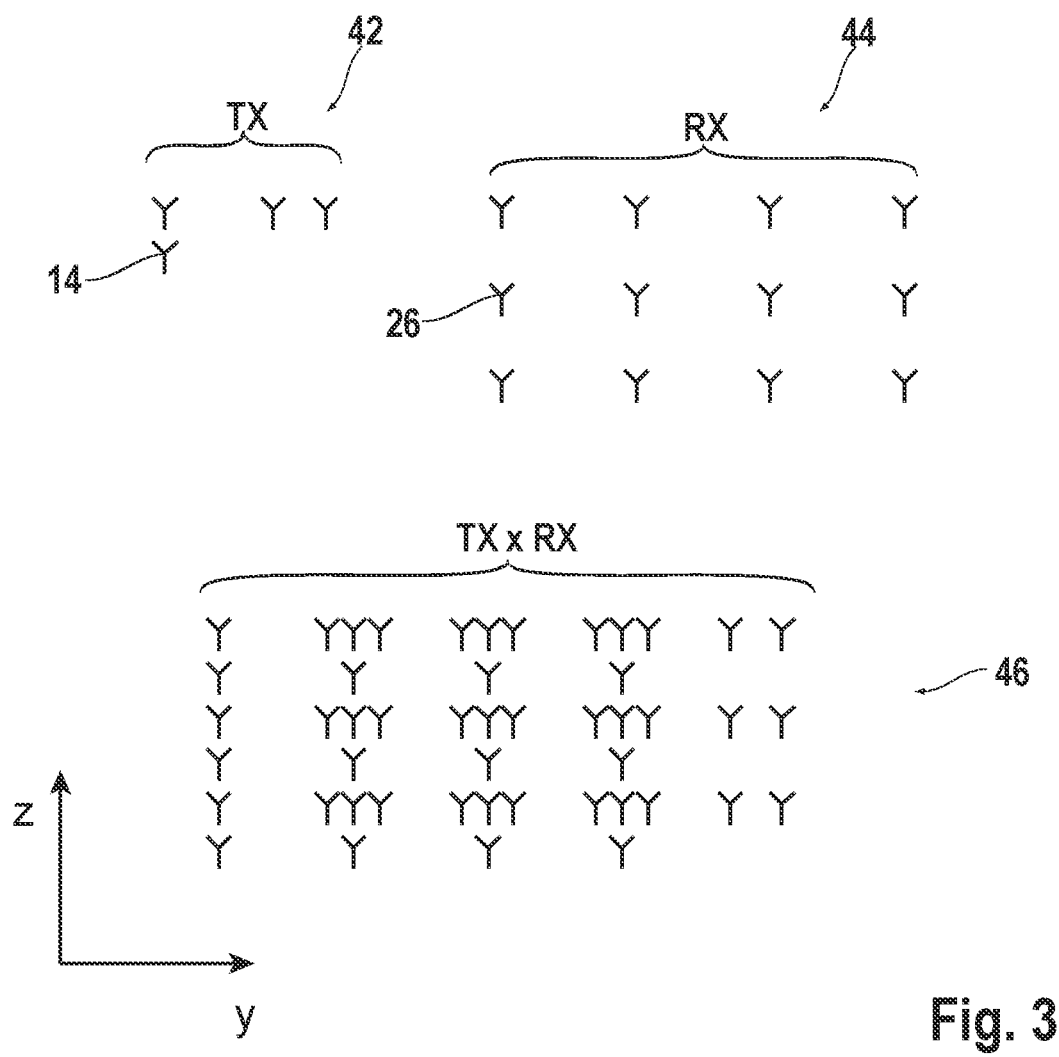
FIG. 3 shows a diagram of an antenna array of the radar system, in accordance with an example embodiment of the present invention.

As shown in FIG. 3, transmitting antennas 14 form a transmitter array 36 and receiving antennas 26 form a receiver array 44. Both arrays in the example shown are two-dimensional, so that MIMO angle measurements are possible both in the azimuth and in elevation.

In receiver array 44, receiving antennas 26 are situated at uniform distances in an angle resolution direction y, for example, in the direction of the azimuth. The distances between the individual receiving antennas in this case are large enough that a large aperture and a correspondingly high angle resolution are achieved already with just a few antennas. However, the distances from antenna to antenna in this case are greater than the half wavelength of the radar radiation, so that the Nyquist uniqueness criterion is not met.

Figure 4:
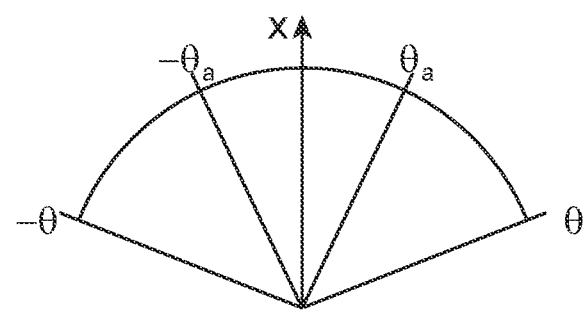
FIG. 4 shows a diagram of a location angle range of the radar system, in accordance with an example embodiment of the present invention

In FIG. 4, a field of view of the radar sensor is shown, which encloses angles from $-\theta$ to $+\theta$, as related to axis x, which is perpendicular to the plane of receiver array 44. The angle measurement results are unambiguous only when the location angle is within a significantly smaller interval from $-\theta_a$ to $+\theta_a$. If it is not possible to exclude larger location angles, then there are multiple angles for which the same phase relationships between the signals at the receiving antennas are obtained, so that the measurement is no longer unambiguous.

In the example shown in FIG. 3, receiving antennas 26 are also situated in elevation (in angle resolution direction z) at uniform distances, and in this direction as well, the antenna distances are large enough that a non-unambiguous undersampling takes place.

Transmitting antennas 14 of transmitter array 42 are situated in the azimuth at non-uniform distances, yet the distances are selected in such a way that an unambiguous angle measurement is possible. For this purpose, however, the aperture is significantly smaller than in the case of receiver array 44, so that the angle resolution is lower. In elevation as well, transmitter array 42 is designed with a smaller aperture for unambiguous angle measurements.

In FIG. 3, a virtual array 46 is also shown, which is obtained when each of receiving antennas 26 is combined with each of transmitting antennas 14, so that the propagation time differences of the signals from the transmitting antennas to the object and from the object to the receiving antennas add up. Ultimately, it is the aperture of this virtual array 46 that determines the resolution capacity of the radar sensor. It is necessary, however, to separate from one another the signal proportions in the receive signal originating from the various transmitting antennas 14 so that the ambiguity of the receiver array may be resolved.

In the example shown in FIG. 3, the two angle resolution directions y and z are also decoupled from one another in receiver array 44, since for each y-position of the receiving antennas all z-positions are also occupied by receiving antennas. In contrast, transmitter array 42 is an example of a non-decoupled array, in which for some y-positions (the two right positions in FIG. 3) not all z-positions are occupied. In general, a decoupled array facilitates the data evaluation, whereas a non-decoupled array requires fewer antenna elements. The decision made between decoupled and non-decoupled arrays may be different for both the transmitting side as well as for the receiving side in accordance with the respective requirements.

The equidistant arrangement of the antenna elements (in the azimuth and/or in elevation) also facilitates the evaluation of the data, since they enable, for example, the use of a fast Fourier transform (FFT). On the other hand, the non-equidistant arrangement of the antennas, as in the case here of transmitting antennas 14, has the advantage that with a given aperture, the uniqueness angle range (FIG. 4) may be optimized.

In the radar system described herein, generally all combinations of equidistant and non-equidistant arrangement and decoupled or non-decoupled arrangement are possible. Similarly, specific embodiments are also possible, in which the transmitter array is designed for ambiguous high-resolution angle measurements, whereas the receiver array is designed for unambiguous angle measurements having a lower angle resolution.

Based on multiplex scheme 20 and the configuration of the antenna array, the radar signals of the transmitting antennas have the following properties:

the total bandwidth used is not completely occupied at each point in time. Instead, only one sub-band is occupied at each point in time so that, however, as viewed over the measuring time, the complete bandwidth is used as a result of all sub-bands being occupied. In one configuration, the entire bandwidth is occupied by each transmitting antenna over the measuring time. In an alternative configuration, the transmitting antennas as a whole occupy the complete bandwidth, but not each transmitting antenna individually.

The sequences of the various transmitting antennas in general have center frequency differences (occupy different sub-bands) and are time-offset.

The phases of the transmit signals at the receiver are thus influenced by the following variables:
distance of the object (due to the frequency offset between transmitting antennas)
relative velocity (due to the time offset between the sequences of the transmitting antennas)
location angle of the object (due to the spatial offset of the transmitting antennas).

Since no temporally superposed frequency ramps are used and only one sub-band per time slot is occupied, one single receiving path of the radar system (FIG. 1) is sufficient for detecting the radar signals of all transmission channels.

Figure 5:
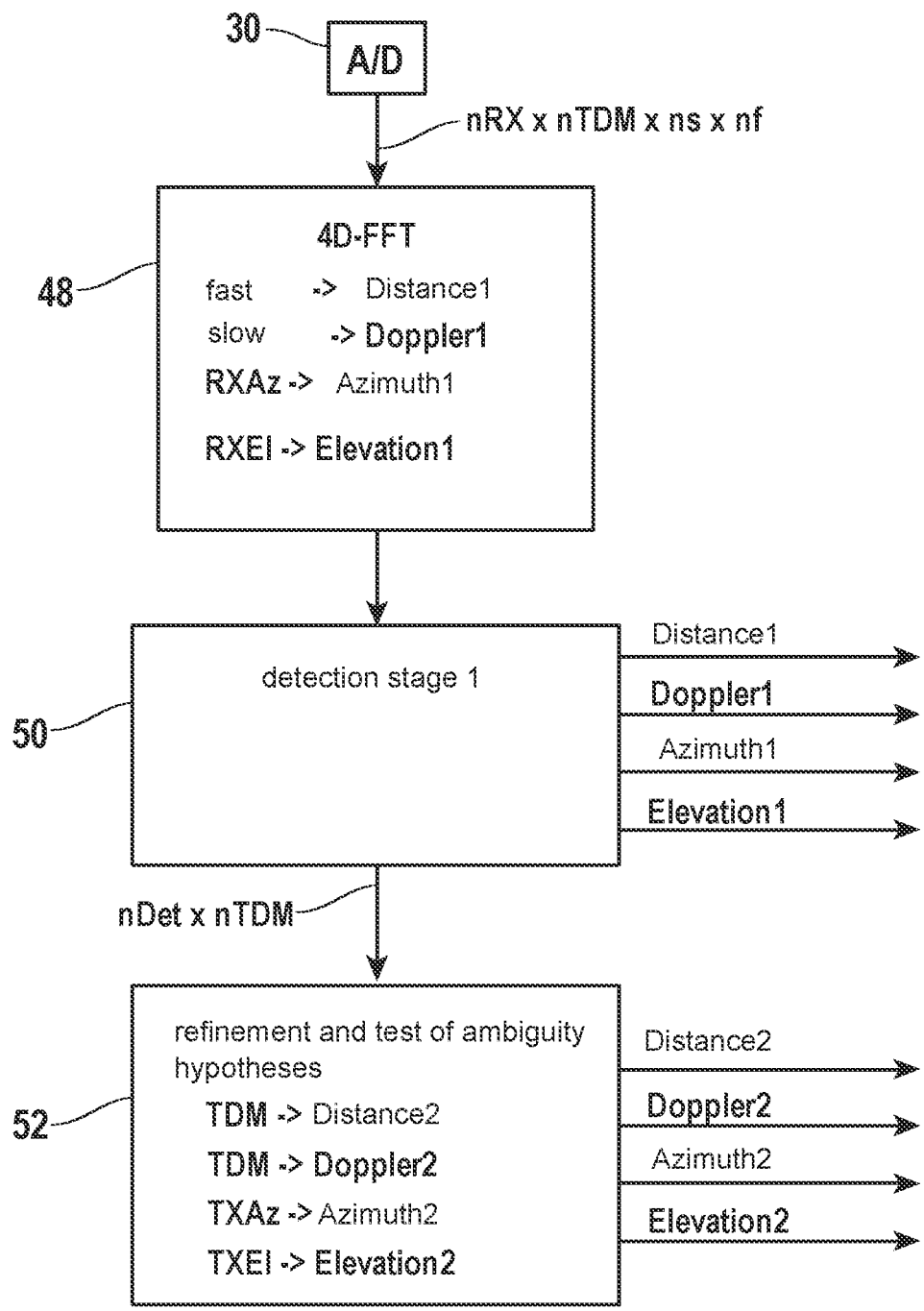
FIG. 5 shows a block diagram of a digital signal evaluation unit according to one specific embodiment of the present invention.

One example of an evaluation unit for evaluating the received signals obtained with the antenna arrays according to FIG. 3 and in the multiplex scheme according to FIG. 2 is now explained with reference to FIG. 5.

The digital data provided from A/D converter 30 are each sampled over a complete measuring cycle. The number of all the (complex) signal values recorded in the measuring cycle is given by the product of the number nRX of receiving antennas 26 of receiver array 44, the number nTDM of time slots 36 per window 34, the number ns of windows 34 per measuring cycle, and the number of of the sampling points on a single frequency ramp 32.

In one processing stage 48, the data sampled per time slot are subjected to a four-dimensional Fourier transform (4D-FFT). The result is a four-dimensional spectrum including the dimensions: "Distance1," "Doppler1," "Azimuth," and "Elevation1." The dimension "Azimuth1" indicates the distribution of the complex amplitudes across the location angle range in the azimuth, based on the data of receiving antennas 26, which are situated in the same row in the azimuth direction. The dimension "Elevation1" correspondingly indicates the distribution across the elevation angle range, based on the data of receiving antennas 26, which are situated in the same column in the elevation direction. The dimension "Doppler1" indicates the Doppler spectrum obtained by the "slow" sampling also in intervals ts. The dimension "Distance1" indicates the distance spectrum based on the "rapid" sampling on individual frequency ramps 32. A unique spectrum is obtained for each transmitted ramp. The results in this dimension are unambiguous but low-resolution, because only the respective narrow sub-band is used in each time slot. The results in all three remaining dimensions are ambiguous due to the respective undersampling (greater temporal distance between the successive ramps of a sequence or greater spatial distance between the receiving antennas).

The four-dimensional spectra are non-coherently integrated (addition of the absolute values of the complex amplitudes). The result is an amplitude distribution in a four-dimensional parameter space 50. Each point in this four-dimensional space is assigned a particular amount of the amplitude sum, and each located object stands out in this space in the form of a peak (local maximum) with a particular distance, a particular Doppler shift, a particular azimuth angle and a particular elevation angle, the latter three variables each being ambiguous in such a way that only one of multiple hypotheses relating to the relative velocity and similarly only one of multiple hypotheses relating to azimuth angle and elevation angle may be assigned to the object. In this parameter space 50, the four-dimensional coordinates of the peaks found are searched, each of which represents a detection result. For each of these points, there are (before the non-coherent integration) nTDM complex amplitudes, which form a vector including nTDM components and are then further evaluated in order to resolve the remaining ambiguities and to improve the distance resolution.

For this purpose, the (complex) amplitudes obtained in the various time slots for each detected object are (coherently) added.

After the detection, the phases of the signals of different transmission channels are used in a second processing stage 52 for each object for removing the restrictions in respective estimation dimensions (distance, velocity, and angle) in a joint parameter estimation. This is possible, since the sequences transmitted from different transmitting antennas include a time offset and frequency offset and, therefore, Doppler-dependent and distance-dependent phases. Since the transmitter array 42 occupies a particular aperture, the phases of the transmit signals also contain the angle information. The estimation of distance, velocity, and angles takes place jointly, since the phase information in the transmission channels is present in coupled form. Multidimensional estimation algorithms may be used, which span the parameter range for each of the estimation parameters, and calculate the parameter combination that best maps the phase progression via the transmission channels. For example, the estimation may take place using a maximum-likelihood algorithm.

The algorithm may be designed to be computationally efficient as a function of the respective configuration by sequentially scanning the search dimensions, i.e., so that it is not necessary to scan the complete parameter space. Alternatively, this algorithm may be accelerated depending on the configuration by using a faster implementation, such as FFT in one or in multiple measuring dimensions. Depending on the configuration, the algorithm may also be designed to be multi-target-enabled.

The result thus obtained for each object is higher-resolution distance values "Distance2" and still high-resolution but now unambiguous velocity estimations and angle estimations "Doppler2," "Azimuth2," and "Elevation2."

Figure 6:
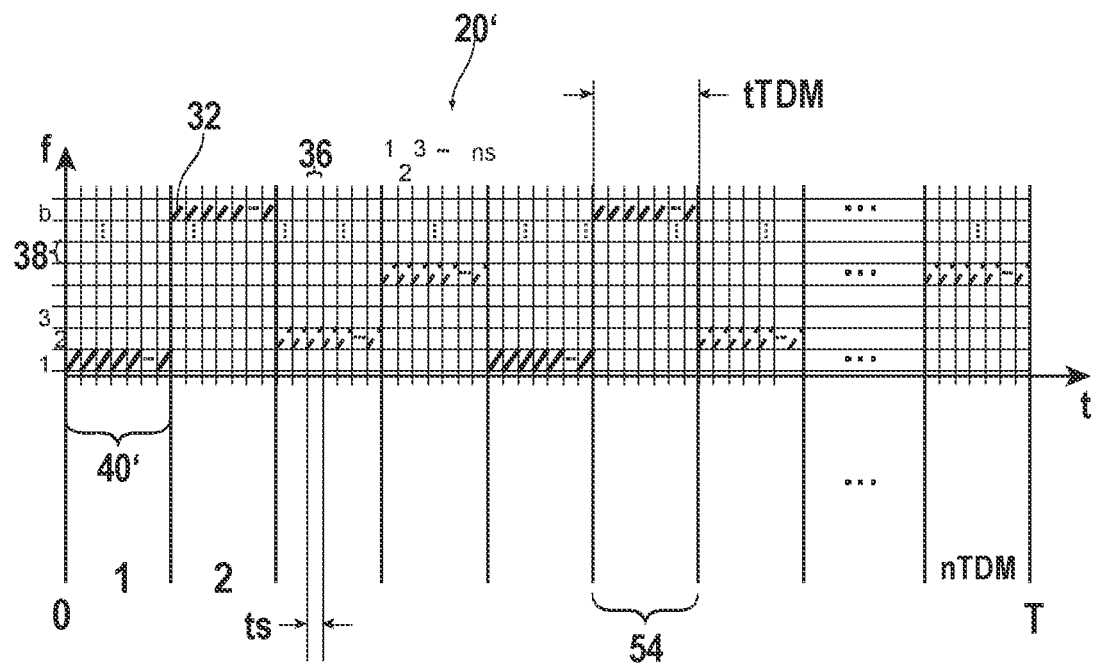
FIG. 6 shows a multiplex scheme according to another specific embodiment of the present invention.
Figure 6:
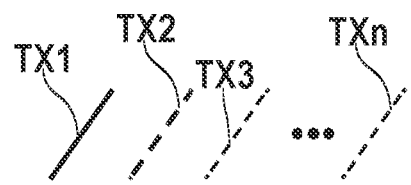

One alternative multiplex scheme 20' is shown in FIG. 6. According to this scheme, the measuring cycle is subdivided into a number nTDM of measuring blocks 54 of length tTDM, and each measuring block encompasses an equal number ns of time slots 36 of length ts. In each measuring block 54, a sequence 40' of frequency ramps 32 is transmitted by exactly one transmitting antenna in a single frequency sub-band. The succession of sequences 40' in this case may be periodically repeated after a certain number of measuring blocks.

In both FIG. 2 as well as in FIG. 6, tTDM refers to the duration of the periods, after which the frequency sub-band and, if necessary, the transmitting antenna is switched, and ts refers to the ramp distance within a sequence 40 or 40'.

Compared to FIG. 2, sequences 40' have a shorter measuring duration, which corresponds here not to the entire length of the measuring cycle, but only to length tTDM of measuring blocks 54. This results in a lower resolution in the Doppler dimension. However, the ramp distance in FIG. 6 is instead reduced within a sequence to length ts of time slot 36. Therefore, no undersampling takes place and the results of the Doppler measurement are unambiguous.

Figure 7:
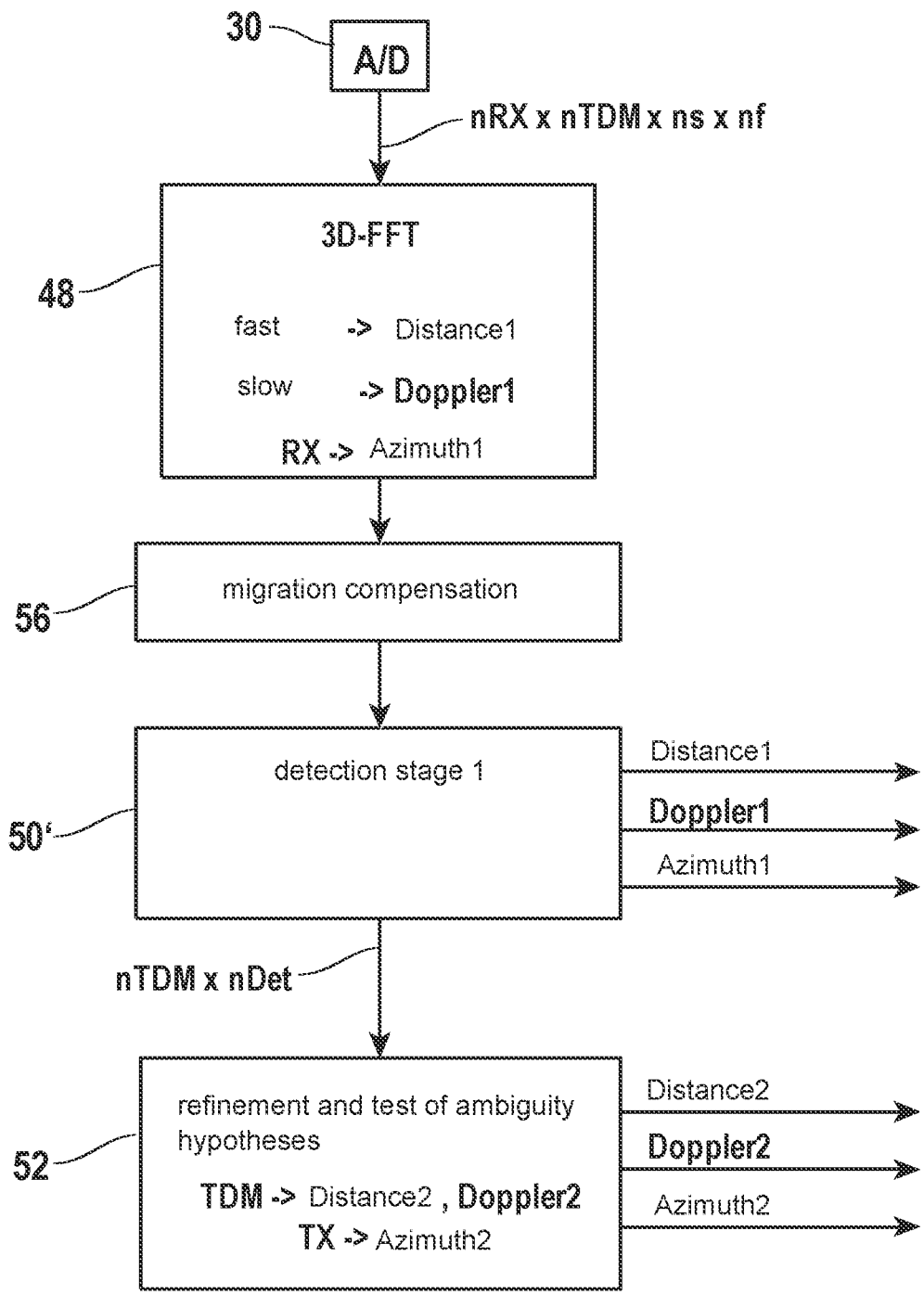
FIG. 7 shows a block diagram of a digital signal evaluation unit according to another specific embodiment.

FIG. 7 shows one example of a signal evaluation unit, which is adapted to multiplex scheme 20' according to FIG. 6. For the sake of simplicity, the angle estimation in elevation is omitted here. In first processing stage 48, the data sampled per measuring block are subjected to a three-dimensional Fourier transform (3D-FFT) in the dimensions "Distance1," "Doppler1," and "Azimuth1." The results in dimensions "Distance1," and "Doppler1" are unambiguous but low-resolution, and only the results in the angle dimension are ambiguous.

In the three-dimensional spectrum, each located radar target stands out as a peak at a particular coordinate position. If all radar targets relative to the radar sensor are at rest, the power spectra obtained for each of the successive measuring blocks are identical to one another. If, however, one of the radar targets has a non-vanishing relative velocity, a perceptible change of the distance of this object may result over the duration of the measuring cycle. A so-called migration effect then occurs, which results in the position of the distance coordinate of the peak in the spectrum shifting somewhat from measuring block to measuring block, the extent of the shift being a function of the relative velocity. This effect may be compensated for with comparatively little computing effort by shifting the distance coordinate in the distance velocity subspace in such a way that the migration of the radar target in the spectrum is reversed. This occurs in FIG. 7 in a correction block 56. The result of this correction is a set of spectra, in which all peaks occupy the same positions.

This is followed by the non-coherent integration and the parameter detection in a three-dimensional parameter space 50'. In this way, low-resolution but unambiguous results "Distance1" and "Doppler1" and high-resolution but ambiguous results "Azimuth1" are obtained.

In second processing stage 52, the resolution in dimensions "Distance2" and "Doppler2" is increased and the ambiguity of the angle estimation is resolved based on the aperture of transmitter array 42.

What is claimed is:
1. A MIMO radar system, comprising:
a transmitter array having multiple transmitting antennas situated at a distance from one another in an angle resolution direction;
a receiver array having multiple receiving antennas situated at a distance from one another in the angle resolution direction; and
a control and evaluation unit to perform the following:
transmitting transmission signals via the transmitter array according to a time multiplex and frequency multiplex scheme in each of multiple repeatedly implemented measuring cycles, a time space and frequency space being divided into non-overlapping time slots and into frequency sub-bands and only one single transmitting antenna of the transmitting antennas being active in each time slot and transmitting in only one single frequency sub-band,
performing preliminary distance estimations and Doppler estimations in a first evaluation stage based on signals received in one measuring cycle of the measuring cycles, and
performing a joint distance estimation, Doppler estimation and angle estimation using a multi-dimensional estimation algorithm in a second evaluation stage based on phases of the signals transmitted by the transmitting antennas, results of the first evaluation stage being refined by increasing accuracy and/or eliminating ambiguities,
wherein a frequency modulation unit controls a high frequency (HF) oscillator, which generates sequences of signals as frequency ramps for the multiple transmitting antennas, wherein an amplifier, which is configured to either block or forward the amplified signals to an associated one of the antennas, is situated in each of multiple transmission channels, wherein the oscillator and the amplifier are activated by a multiplex unit according to a time and frequency multiplex scheme so that each of the multiple transmitting antennas transmits a frequency-modulated signal in a particular frequency sub-band within a particular time slot, wherein in a processing stage, data sampled per time slot are subjected to a four-dimensional Fourier transform (4D-FFT), resulting in a four-dimensional spectrum including the dimensions of: "Distance1", "Doppler1", "Azimuth1", and "Elevation1", wherein the four-dimensional spectra are non-coherently integrated by addition of absolute values of complex amplitude, which provides an amplitude distribution in a four-dimensional parameter space, wherein each point in the four-dimensional space is assigned a particular amount of the amplitude sum, and each located object stands out in this space as a peak or a local maximum with a particular distance, a particular Doppler shift, a particular azimuth angle and a particular elevation angle.

2. The radar system as recited in claim 1, wherein the transmission signals include sequences of frequency ramps, whose ramp slope for a distance measurement is configured according to a FMCW principle, and Doppler measurements are based on relative phases of the signals obtained in a sequence of the frequency ramps.

3. The radar system as recited in claim 2, wherein an equally long row of equidistant time slots is assigned to each transmitting antenna of the transmitting antennas.

4. The radar system as recited in claim 3, wherein the time slots, which are assigned to the transmitting antennas, are interleaved with one another so that a frequency ramp of a first transmitting antenna of the transmitting antennas is followed by a number of frequency ramps, which are transmitted by other transmitting antennas of the transmitting antennas and/or in other sub-bands, before a next frequency ramp of the sequence is transmitted by the first transmitting antenna in the same sub-band.

5. The radar system as recited in claim 1, wherein the time slots assigned to the transmitting antennas are organized in blocks so that in a first block, a first transmitting antenna of the transmitting antennas transmits a complete sequence of ramps and then in the next block, another transmitting antenna of the transmitting antennas transmits a complete sequence.

6. The radar system as recited in claim 1, wherein the control and evaluation unit is further configured to subject phases of signals transmitted and received at various measuring points in time to a distance-dependent and velocity-dependent coordinate transformation, in order to compensate for relative velocities of objects in an elapsed time between the measuring points in time.

7. The radar system as recited in claim 1, wherein in the first evaluation stage, an angle estimation also already takes place based on phases of the signals which are received by the multiple receiving antennas, but have been transmitted by the same transmitting antenna.

8. The radar system as recited in claim 1, wherein the transmitter array is configured for unambiguous angle measurements and the receiver array is configured for ambiguous higher-resolution angle measurements.

9. The radar system as recited in claim 1, wherein the receiver array is configured for unambiguous angle measurements and the transmitter array is configured for ambiguous higher-resolution angle measurements.

10. The radar system as recited in claim 1, wherein the receiving antennas and/or the transmitting antennas are situated equidistantly in the angle resolution direction.

11. The radar system as recited in claim 10, wherein the receiving antennas are situated equidistantly in the angle resolution direction and the angle estimation takes place based on the receiver array via a fast Fourier transform.

12. The radar system as recited in claim 1, wherein the dimension "Azimuth1" indicates a distribution of complex amplitudes across a location angle range in the azimuth, based on the data of the receiving antennas, which are situated in a same row in the azimuth direction, wherein the dimension "Elevation1" indicates the distribution across the elevation angle range, based on the data of receiving antennas, which are situated in the same column in the elevation direction, wherein the dimension "Doppler1" indicates a Doppler spectrum obtained by slow sampling in intervals ts, wherein the dimension "Distance1" indicates a distance spectrum based on rapid sampling on individual frequency ramps, a unique spectrum being obtained for each transmitted ramp.

13. The radar system as recited in claim 12, wherein results in the Distance1 dimension are unambiguous but low-resolution, because only a respective narrow sub-band is used in each time slot, and wherein the results in all three remaining dimensions are ambiguous due to the respective undersampling, so that there is greater temporal distance between successive ramps of a sequence or greater spatial distance between the receiving antennas.

14. The radar system as recited in claim 1, wherein the particular Doppler shift, the particular azimuth angle and the particular elevation angle are each ambiguous so that only one of multiple hypotheses relating to the relative velocity and only one of multiple hypotheses relating to azimuth angle and elevation angle is assignable to the object.

15. The radar system as recited in claim 1, wherein in the four-dimensional parameter space, the four-dimensional coordinates of the peaks found are searched, each of which represents a detection result, wherein for each of these points, there are n-time-division-multiple (nTDM) complex amplitudes, which form a vector including nTDM components and are then further evaluated to resolve remaining ambiguities and to improve a distance resolution, wherein for this purpose, the complex amplitudes obtained in the various time slots for each detected object are coherently added.

\* \* \* \* \*